United States Patent [19]

Wilkins et al.

[11] Patent Number: 4,585,921
[45] Date of Patent: Apr. 29, 1986

[54] TORCH OPERATION INTERLOCK DEVICE

[75] Inventors: Raymond G. Wilkins, Hanover; Bruce O. Hatch, Lebanon, both of N.H.

[73] Assignee: Thermal Dynamics Corporation, West Lebanon, N.H.

[21] Appl. No.: 515,950

[22] Filed: Jul. 20, 1983

[51] Int. Cl.$^4$ ................................................. B23K 9/00
[52] U.S. Cl. ........................ 219/121 PT; 219/121 PP; 219/121 PW
[58] Field of Search ......... 219/132, 121 PP, 121 PW, 219/74, 121 PT; 361/90, 91, 92; 315/111.21

[56] References Cited

U.S. PATENT DOCUMENTS

| | | | |
|---|---|---|---|
| 2,617,913 | 11/1952 | Oestreicher | 219/132 |
| 3,558,973 | 1/1971 | Pochert et al. | 315/111.21 |
| 4,100,390 | 7/1978 | Jackson | 219/74 |
| 4,151,396 | 4/1979 | Veal | 219/132 |
| 4,330,700 | 5/1982 | Jagieniak et al. | 219/121 PP |

FOREIGN PATENT DOCUMENTS 81106  6/1983  European Pat. Off. .

OTHER PUBLICATIONS

AES Brochure.
Eugotral Brochure.
AES Price List.
Instruction Manual, Pak 3 Cutting System, Thermal Dynamics Corporation.
Sales Literature, Thermal Arc Pak 3, Plasma Cutting System, Thermal Dynamics Corporation.

Primary Examiner—C. L. Albritton
Assistant Examiner—M. M. Lateef
Attorney, Agent, or Firm—Majestic, Gallagher, Parsons & Siebert

[57] ABSTRACT

The present invention minimizes shock hazard in using a touch start plasma torch. The resistance between the torch tip and the workpiece is compared to a predetermined value set by estimating the resistance between a person's hand to ground under the most unfavorable conditions. In the preferred embodiment, such comparison is performed by supplying an AC voltage to a resistor in series with a torch tip, the resistor having a resistance equal to the predetermined value. The peak voltage at a point in the circuit connection between the resistor and torch tip is sensed and if such peak is less than half of the peak voltage of the AC voltage supplied to the resistor and torch tip, the resistance between the torch tip and ground is less than the predetermined value and a control signal will be generated. A relay will switch on the power supply supplying high voltage between the cathode and the workpiece only when it receives the control signal indicating that the resistance between the torch tip and ground is below the predetermined value.

14 Claims, 3 Drawing Figures

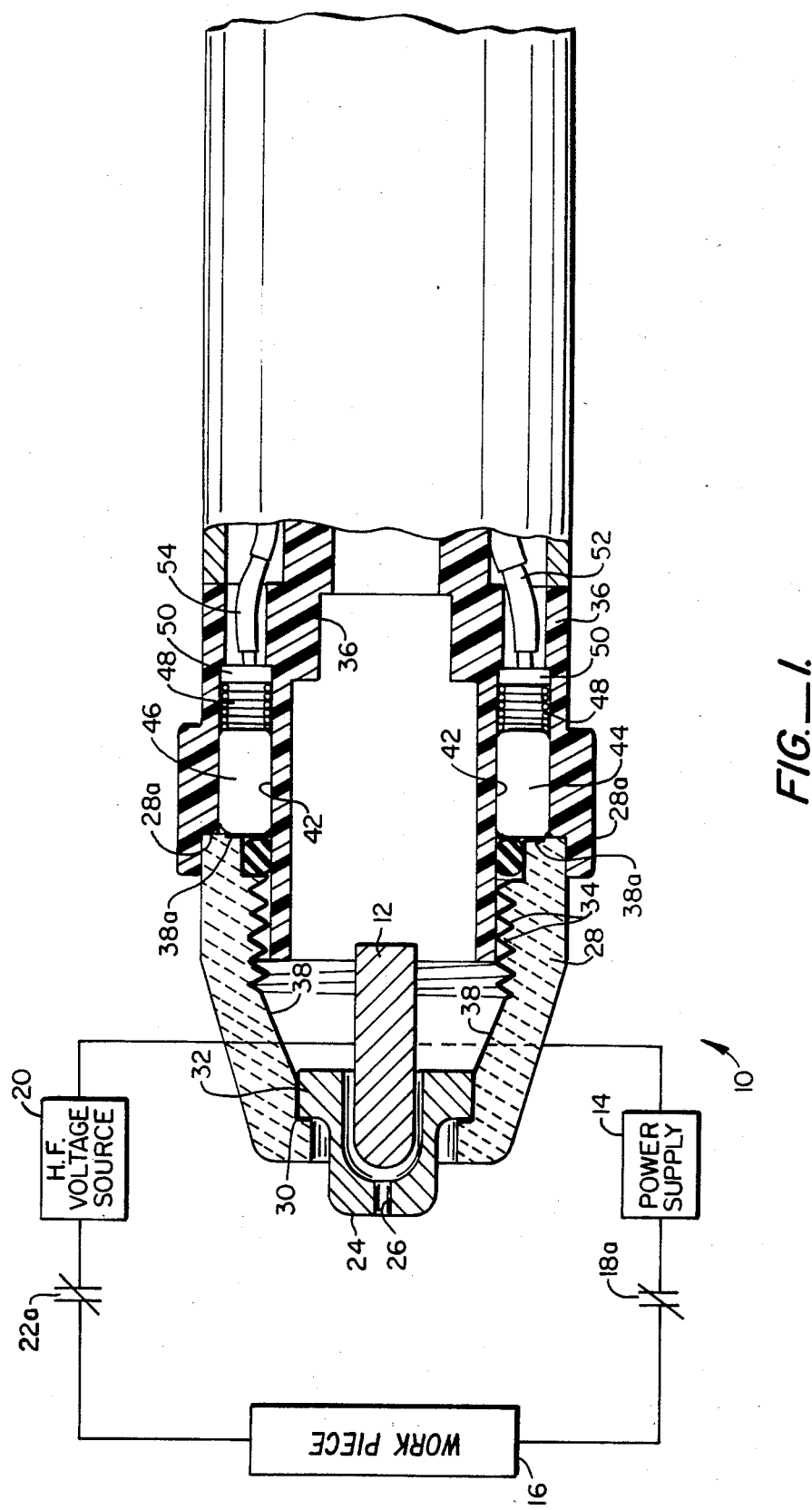
FIG._1.

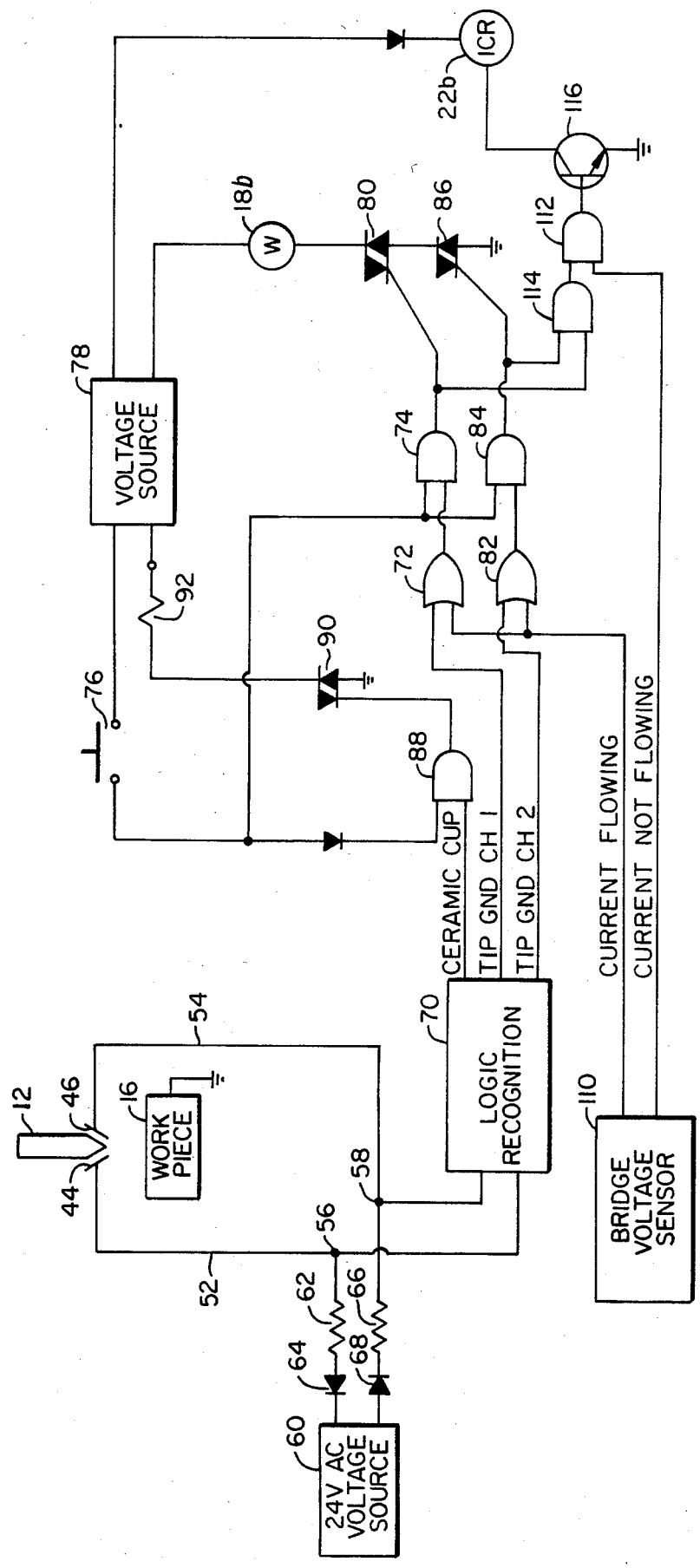
FIG._2.

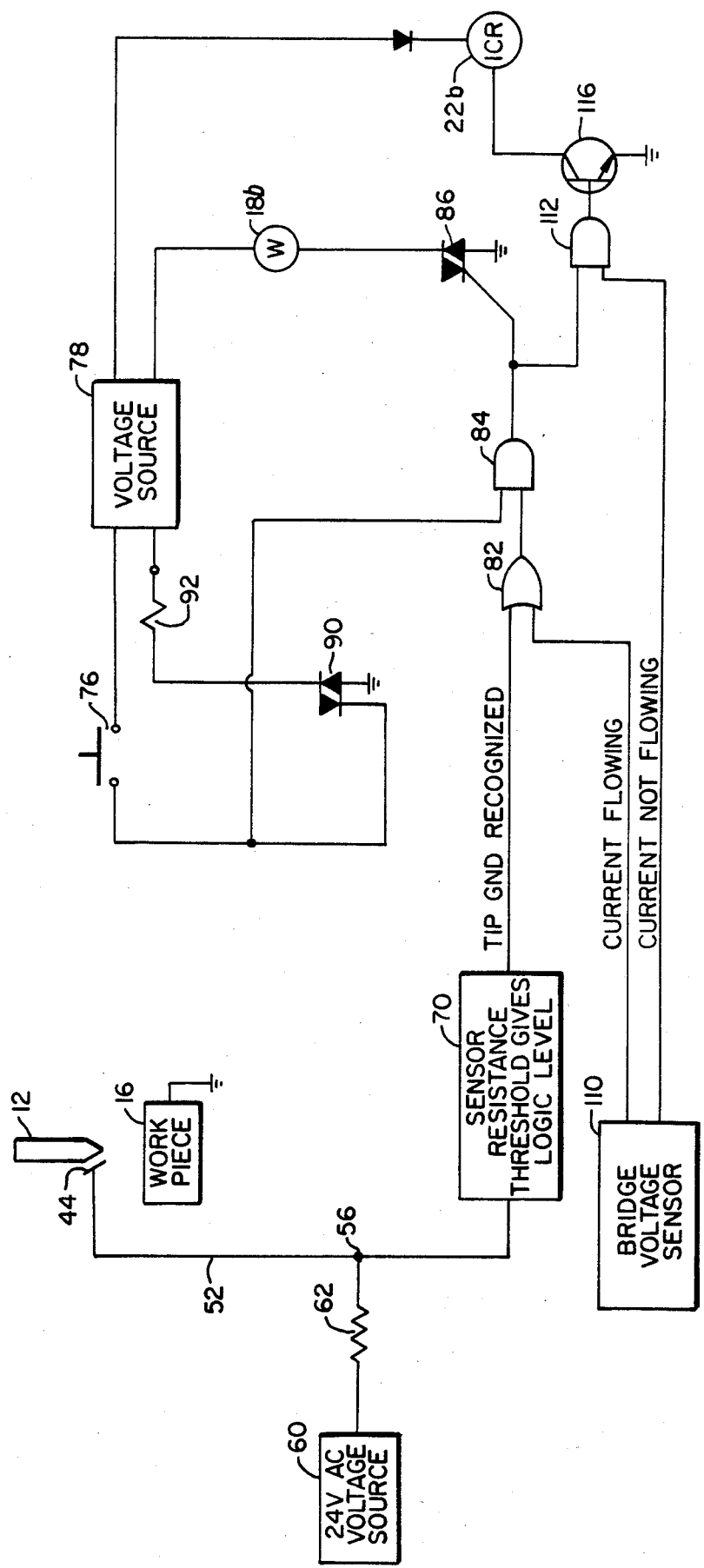

TORCH OPERATION INTERLOCK DEVICE

BACKGROUND OF THE INVENTION

This invention is related generally to plasma torches which are generally used for cutting, welding and spray bonding and more specifically to an operation interlock device for such torches.

Plasma torches, also known as electric arc torches, are commonly used for cutting, welding and spray bonding of workpieces and operate by directing a plasma consisting of ionized gas particles toward the workpiece. In the operation of a typical plasma torch, such as illustrated in U.S. Pat. Nos. 4,324,971, 4,170,727 and 3,813,510 assigned to the same assignee as the present invention, a gas to be ionized is supplied to the front end of the torch in front of a negatively-charged electrode. The welding tip which is adjacent to the end of the electrode, at the front end of the torch, has a sufficiently high voltage applied thereto to cause a spark to jump between the electrode and the welding tip thereby heating the gas and causing it to ionize. A pilot DC voltage between the electrode and the welding tip maintains an arc known as the pilot, or non-transferred arc. The ionized gas in the gap appears as a flame and extends externally off the tip where it can be seen by the operator. As the torch head or front end is brought down towards the workpiece, the arc jumps from the electrode to the workpiece since the impedance of the workpiece current path is lower than the impedance of the welding tip current path.

In recent years, touch start plasma torches have been developed such as the Thermal Arc Pak 3 cutting system developed by the assignee. Instead of using a pilot arc to start the torch, as described above, the touch start plasma torch initiates the transferred arc between the cathode and the workpiece by touching the workpiece with the torch tip. No pilot arc will be visible when power to the touch start torch is on. Since there would be no visible flame at the torch head when power is on, torch operators or other persons may accidentally touch the torch head and may get an electrical shock. It is therefore desirable to provide a means to minimize getting electrical shocks by touching the torch head.

Operation interlocks have been used in the past in metal working equipment. For example, an operation interlock device has been employed in pressing machines for pressing threaded inserts into sheet metal. The interlock device prevents large pincer arms from closing to crush an object such as a finger by sensing the electrical resistance of the object to be pressed.

SUMMARY OF THE INVENTION

The present invention minimizes shock hazard in using a touch start plasma torch. According to the present invention, the resistance between the torch tip and the workpiece is compared to a predetermined value. Such predetermined value is set by estimating the resistance between a person's hand to ground under the most unfavorable conditions such as when the person is wet with perspiration or water. The means for comparing such resistance to the predetermined value will generate a control signal indicative of whether such resistance is below the predetermined value. A relay means receives the control signal and will switch on the power supply supplying high voltage between the cathode and the workpiece only when the resistance between the torch tip and ground is below the predetermined value.

BRIEF DESCRIPTION OF THE DRAWINGS

FIG. 1 is a partially schematic and partially cross-sectional view of the torch head and the operation interlock device to illustrate the present invention.

FIG. 2 is a schematic view of the work sensing circuit illustrating the preferred embodiment of this invention.

FIG. 3 is a schematic view of the work sensing circuit illustrating an alternative embodiment of this invention.

DETAILED DESCRIPTION OF THE PREFERRED EMBODIMENT

FIG. 1 is a partial cross-sectional and partial schematic view of the torch head of the thermal torch and a part of the operation interlock device illustrating the invention. As shown in FIG. 1, the thermal plasma torch 10 includes a cathode 12 and a power supply 14 which supplies the necessary DC voltage between the cathode 12 and the workpiece 16 to perform welding, cutting or other operations. Connected in series with power supply 14 between cathode 12 and workpiece 16 is a relay contact 18a for switching power supply 14 on and off to the cathode and workpiece. A high frequency voltage source 20 supplies a high frequency voltage between cathode 12 and workpiece 16 for initiating the transferred arc therebetween. Relay contact 22a switches on and off such high frequency voltage supplied between the cathode and the workpiece. Power supply 14 and high frequency voltage source 20 are frequently included in the same unit capable of supplying both DC and high frequency voltages. In FIG. 1 they are shown separate for simplicity. Thermal plasma torch 10 also includes a torch tip 24 adjacent to cathode 12. Torch tip 24 is held in place and attached to the body of torch 10 by a conventional means not shown in FIG. 1. Torch tip 24 surrounds the cathode at the working end of the torch but has a passageway 26 therein to allow an arc to be established between the cathode and the workpiece.

To start the torch, the torch tip 24 is brought close to the workpiece to touch the workpiece, and relay contacts 22a and 18a are closed. The high frequency voltage supplied by source 20 jumps the gap between cathode 12 and workpiece 16 to initiate a transferred arc. The DC voltage supplied by power supply 14 maintains the transferred arc for welding, cutting or other purposes. If relay contacts 18a and 22a are such that they could be closed when torch tip 24 is not touching workpiece 16, the torch operator or other persons may get an electric shock by accidentally touching the torch tip since the torch tip will be charged to high voltage (transmitted from the cathode across the thin air gap between the cathode and the torch tip). It is therefore desirable to be able to close relay contacts 18a and 22a only when torch tip 24 is touching workpiece 16.

In the preferred embodiment of the invention, illustrated in FIG. 1, included in the torch head is a cup 28 made of a non-conductive material such as ceramic. The front end of the cup has a shoulder 30 onto which flange 32 of the torch tip may rest. The front end of the cup surrounds most of the torch tip leaving only a small portion protruding. The inside surface of cup 28 near its rear end 28a is threaded with threads 34 so that the cup may be screwed onto the plastic housing 36 of the torch. The inside of the cup 28 is coated with electrically conductive material 38. The coated portion of the cup inner surface extends from shoulder 30 through threaded portion 34 to surface 28a of the cup rear end, so that the layer 38 electrically connects flange 32 of torch tip 30 to its end portion 38a. Housing 36 of the torch defines therein two cylindrical holes 42 into which conductive pins 44,46 fit. Conductive springs 48 press against pins 44,46 and leads 50 of wires 52,54 to connect layer 38a to wires 52,54 respectively when cup 28 is screwed onto the torch housing. The resistance between the torch tip and ground can be measured through wires 52,54. Electrical shock hazard would be minimized if the relay contacts 18a, 22a are closed only when such resistance indicates that the torch tip is touching the workpiece.

FIG. 2 is a schematic view of a work sensing circuit illustrating the preferred embodiment of this invention. The work sensing circuit will sense whether the torch tip is touching the workpiece. In the preferred embodiment, the workpiece is grounded. When the torch tip touches the workpiece, the resistance between the torch tip and ground should be a small resistance no more than the contact resistance between the torch tip and the workpiece. If instead, the torch tip is in contact with the person's hand, the resistance between the torch tip and ground is typically 1000 ohms or more. When the person touching the torch tip is wet from perspiration or rain water, the tip-to-ground resistance may decrease to below 1000 ohms. First, the triggering resistance between the torch tip and ground for closing relay contacts 18a and 22a may be chosen so that it is well above the contact resistance between the torch tip and workpiece but also well below the resistance when the torch tip is connected to ground through a wet person. A resistance of 75 ohms may be a suitable triggering resistance.

FIG. 2 is a schematic view of a work sensing circuit of the preferred embodiment for sensing whether the torch-to-ground resistance is less than the triggering resistance. As shown in FIG. 2, the two pins 44 and 46 are connected through wires 52 and 54 respectively to sensing points 56 and 58. Sensing point 56 is connected to an alternating current voltage source 60 through a resistor 62 and diode 64 connected in series therebetween. The polarity of diode 64 is such that only negative pulses from source 60 are passed to resistor 62 and sensing point 56. Sensing point 58 is connected to source 60 through resistor 66 and diode 68. The polarity of diode 68 is such that the diode passes only positive pulses to resistor 66 and sensing point 58. The resistance of resistors 62 and 66 are chosen to be substantially the same as the triggering resistance.

If the resistance between lead 44 and ground is less than the triggering resistance the voltage at sensing point 56 will have a peak voltage less than half of the peak voltage of the voltage source 60. A suitable peak amplitude of signals from source 60 may be 24 volts. Therefore if the peak voltage sensed at sensing point 56 is below 12 volts, the resistance between lead 44 and ground is less than the triggering resistance. If cup 28 has been screwed onto the torch housing so that its inner coating 38 contacts lead 44, then the resistance between torch tip 24 and ground is also less than the triggering resistance since lead 44 is connected to the torch tip through the inner coating 38. If, however, the peak voltage detected at sensing point 56 is above 12 volts, it indicates that the resistance between lead 44 and ground is greater than the triggering resistance. This means that either cup 28 is missing so that lead 44 is not connected to the torch tip or even though the cup 28 is in place, torch tip 24 is connected to ground not through the workpiece but through a high resistance body such as a person. In either case, it is undesirable to close the relay contacts 18a and 22a. Therefore, if the peak voltage detected at point 56 is below 12 volts it is appropriate to close the relay contacts, whereas if the peak voltage detected is above 12 volts, it is inappropriate to do so. Similarly, if the peak voltage detected at sensing point 58 is below 12 volts, it is appropriate to close the relay contacts, whereas, if the peak voltage detected is above 12 volts, it is inappropriate to do so. Two sensing points 56 and 58 and two sensing circuits are provided as redundant protection for minimizing electrical shock hazard in case any component in one of the sensing circuit fails. It is understood that one sensing circuit is sufficient and that more sensing circuits may be employed if desired to further minimize electrical shock hazard caused by component failure.

The peak voltages at sensing points 56 and 58 are sensed by a logic recognition unit 70. When unit 70 detects that peak voltage at sensing point 56 is below 12 volts, it will provide a signal to OR gate 72 which in turn will provide a signal to AND gate signal 74. If switch 76 of the torch is also depressed, voltage source 78 will also provide a signal to AND gate 74 which, together with the signal from OR gate 72 will cause AND gate 74 to provide a signal to triac 80. Similarly, if the peak voltage at sensing point 58 is detected by unit 70 is below 12 volts and switch 76 is closed, the OR gate 82 will provide a signal to AND gate 84 which together with the signal from voltage source 78 when switch 76 is closed will cause AND gate 84 to provide a signal to triac 86. Therefore, if the peak voltages at point 56 and 58 are both below 12 volts, and switch 76 is closed, both triacs 80 and 86 will conduct and current will flow through relay coil 18b from voltage source 78 and ground. Such current will energize relay coil 18b causing the relay contact 18a of FIG. 1 to close thereby supplying current from the power supply 14 between the cathode 12 and the workpiece 16. If one or more components such as AND gate 84 and triac 86 fail in one of the sensing circuits causing triac 86 to always conduct even though the peak voltage at 58 is above 12 volts (which means that the torch tip is touching a high resistance body instead of the workpiece), the other sensing circuit will still cause triac 80 to be in a non-conducting state so that no current flows through relay coil 18b to close relay contact 18a. By putting triacs 80 and 86 in series, the two sensing circuits will still function even though there may have been a component failure in one of the circuits.

The work sensing circuit shown in FIG. 2 may also be used to detect whether cup 28 is properly screwed onto the torch housing before the transferred arc is started. Diode 64 passes only negative pulses from source 60 to point 56 and lead 44. Diode 68 passes only positive pulses from source 60 to point 58 and lead 46. Therefore, if cup 28 is not screwed onto the torch housing or not screwed on properly so that the inner coating 38 does not contact leads 44,46 respectively, leads 44 and 46 will not be connected electrically so that logic recognition unit 70 senses only negative pulses at point 56 and only positive pulses at point 58. In such circumstances, closing the switch 76 will not enable gas to be turned on to provide for plasma as explained below. If however, cup 28 is properly in place so that leads 44 and 46 are connected electrically, logic recognition unit 70 will sense both positive and negative pulses at sensing points 56 and 58 and will provide a signal to AND gate 88. If switch 76 is closed, voltage source 78 will provide another signal to AND gate 88 which together with the signal from unit 70 causes AND gate 88 to provide a signal to triac 90 causing it to conduct. Current will flow through solenoid 92 from source 78 to ground. Solenoid 92 is then energized to turn on a gas valve (not shown) which provides gas for plasma in a conventional manner. Thus, if cup 28 is not properly screwed in place, closing the switch 76 will not even turn on gas for plasma. This will alert the torch operator to check the cup. While it is convenient to employ the same circuitry for sensing whether the cup is on and for sensing whether the torch tip is grounded, it will be understood that separate circuits may be employed and that such configurations are within the scope of this invention.

Bridge voltage sensor 110 senses whether current is flowing between cathode 12 and workpiece 16. If it senses that current is flowing, then it is desirable to keep the current flowing even though the torch tip may not be grounded since light from the transferred arc will be sufficient to warn the torch operator or other persons not to touch the torch tip. Therefore, if sensor 110 senses that current is flowing, it will provide a signal to OR gate 72 which in turn will provide a signal to AND gate 74. If the torch switch 76 is also closed, then gate 74 will provide a signal causing triac 80 to conduct. Similarly, if sensor 110 senses current is flowing between the cathode and workpiece and switch 76 is closed, triac 86 will conduct so that relay contact 18a will not be opened to turn off power to the torch as long as the transferred arc is on, and switch 76 is closed.

If bridge voltage sensor 110 senses, however, that current is not flowing so that there is no transferred arc as yet established between cathode and the workpiece, sensor 110 will provide a signal to AND gate 112. If logic recognition unit 70 senses that the resistances between leads 44,46 and ground are each less than the triggering resistance, it will, as before, cause AND gates 74,84 to provide a signal to AND gate 114 which will in turn provide a signal to AND gate 112. AND gate 112 would then provide a signal to the gate of transistor 116 which in turn enables electric current to flow from voltage source 78 to ground through a relay coil 22b. The current through coil 22b will energize the coil and close relay contact 22a causing high frequency voltages to be applied between the cathode and the workpiece (FIG. 1). The high frequency voltage will initiate a transferred arc between the cathode and workpiece and is then maintained by power from the power supply 14 shown in FIG. 1. After the transferred arc is established, sensor 110 will sense that current is flowing so that it will provide no signal to AND gate 112. AND gate 112 will provide no signal to the gate of transistor 116 so that the collector current will cease and relay contact 22a will be opened thereby cutting off the high frequency voltage applied between the cathode and the workpiece.

In the preferred embodiment illustrated above, two sensing points 56,58 and two sensing circuits are provided as redundant protection for minimizing electrical shock hazard. It will be understood, however, that only one sensing point and one sensing circuit may be adequate to minimize electrical shock hazard as in the alternative embodiment illustrated by the sensing circuit of FIG. 3. As shown in FIG. 3, only one sensing point 56 and one sensing circuit are employed. As in the preferred embodiment, if the resistance between lead 44 and ground is less than the resistance of resistor 62 (which is chosen to be substantially the same as the triggering resistance) the voltage at sensing point 56 will have a peak voltage less than half of the peak voltage of the voltage source 60. The peak voltage at point 56 is sensed by sensor 70. If sensor 70 senses that the peak voltage at point 56 is below half of the peak voltage of voltage source 60, sensor 70 will provide a signal to OR gate 82. If the peak voltage sensed is above half of the peak voltage of source 60, no such signal will be provided by sensor 70. The signal provided by sensor 70 will cause OR gate 82 to provide a signal to AND gate 84. If switch 76 is closed, voltage source 78 will provide a signal to AND gate 84 which together with the signal from OR gate 82 will cause triac 86 to conduct. Then current will flow through relay coil 18b from voltage source 78 to ground to close relay contact 18a of FIG. 1 as before. Therefore, if the resistance between lead 44 and ground is below the triggering resistance and switch 76 is closed then the sensing circuit of the alternative embodiment will cause relay contact 18a of FIG. 1 to be closed.

If bridge voltage sensor 110 senses that current is flowing between cathode 12 and workpiece 16, the sensing circuit of the alternate embodiment will enable the current to continue flowing even though the torch tip may not be grounded since light from the transferred arc will be sufficient to warn the torch operator or other persons not to touch the torch tip. Thus, if sensor 110 senses that current is flowing it will provide a signal to OR gate 82 which will in turn provide a signal to AND gate 84. If the torch switch 76 is also closed, then voltage source 78 will provide a signal to AND gate 84 which together with a signal from OR gate 82 will cause AND gate 84 to provide a signal to triac 86 causing it to conduct. Current will then flow from voltage source 78 through relay coil 18b to ground causing relay contact to stay closed so that the transferred arc is not interrupted. If bridge voltage sensor 110 senses, however, that current is not flowing so that there is no transferred arc, sensor 110 will provide a signal to AND gate 112. If sensor 70 senses that the resistance between lead 44 and ground is less than the triggering resistance and switch 76 is closed, AND gate 84 as before will provide a signal to triac 86 as well as AND gate 112. Such signal together with a signal from bridge voltage sensor 110 will enable AND gate 112 to provide a signal to the gate of transistor 116, enabling collector current to flow from voltage source 78 to ground through a relay coil 22b. The current through coil 22b will energize the coil and close relay contact 22a causing high frequency voltages to be applied between the cathode and the workpiece (FIG. 1). The high frequency voltage will, as in the preferred embodiment, initiate a transferred arc between the cathode and workpiece and is then maintained by power from the power supply 14 shown in FIG. 1. After the transferred arc is established, sensor 110 will sense that current is flowing so that it will provide no signal to AND gate 112. AND gate 112 will provide no signal to the gate of transistor 116 so that the collector current will cease and relay contact 22a will be opened thereby cutting off the high frequency voltage applied between the cathode and the workpiece.

The above description of method and construction used is merely illustrative thereof and various changes in shapes and sizes, materials or other details of the method and construction may be within the scope of the appended claims.

What is claimed is:

1. An operation interlock device for minimizing electrical shock hazard in using a plasma torch, said torch including a cathode, the cathode enclosed by a cup and an electrically conductive torch tip adjacent to the cathode and a power supply for starting and maintaining a transferred arc between the cathode and a workpiece without employing a pilot arc, wherein the transferred arc is started by causing the torch tip to touch the workpiece, said interlock device comprising:

means for comparing the resistance between the torch tip and workpiece to a predetermined value, said comparing means adapted to generate a control signal indicative of whether such resistance is below the predetermined value and of whether the torch tip is touching the workpiece; and relay means responsive to said control signal for switching on said power supply when the resistance between the torch tip and workpiece is below the predetermined value to start and maintain a transferred arc between the cathode and the workpiece.

2. The device of claim 1, wherein the workpiece is grounded and said comparing means measures the resistance between the torch tip and ground.

3. The device of claim 2 wherein the comparing means comprises a voltage source for supplying a voltage with a selected peak amplitude, a resistor with resistance substantially equal to the predetermined value connected in series between the tip and the voltage source, such that when the resistance between the tip and ground is less than the predetermined value, the voltage at a point of the connection between the tip and the resistor will have a peak amplitude less than half that of the selected peak amplitude of the voltage source, and that when such resistance is greater than the predetermined value, such voltage will have a peak amplitude greater than half that of the selected peak amplitude of the voltage source.

4. The device of claim 1, further comprising a bridge voltage sensor for sensing the voltage between the cathode and the workpiece, said sensor being adapted to supply a second control signal indicative of whether current is flowing between the cathode and the workpiece, wherein said relay means is responsive to said second control signal for switching on said power supply when current is flowing between the cathode and the workpiece.

5. An operation interlock device for reducing electrical shock hazard in using a plasma torch, said torch including a non-electrically conductive housing, a cathode, an electrically conductive torch tip adjacent to the cathode, a source of gas for generating plasma and a power supply for starting and maintaining a transferred arc between the cathode and a grounded workpiece without employing a pilot arc, wherein the transferred arc is started by causing the torch tip to touch the workpiece, said interlock device comprising:

a non-electrically conductive cup adapted to be mounted onto the housing and adjacent to the torch tip for shielding the cathode, said cup having an inner electrically conductive coating adapted for electrically contacting the torch tip when the cup is mounted onto the housing;

means for determining whether the inner coating of the cup is electrically contacting the torch tip, said determining means adapted to generate a first control signal indicative of whether the cup is electrically in contact with the torch tip;

first relay means responsive to said first control signal for turning on the gas from the source of gas for generating plasma when the cup is electrically in contact with the torch tip;

means for comparing the resistance between the torch tip and ground to a predetermined value, said comparing means adapted to generate a second control signal indicative of whether such resistance is less than the predetermined value; and second relay means responsive to said second control signal for switching on said power supply when the resistance between the torch tip and ground is less than the predetermined value.

6. The device of claim 5, wherein the comparing means comprises a voltage source for supplying a voltage with a selected peak amplitude, a resistor with resistance substantially equal to the predetermined value connected in series between the tip and the voltage source, such that when the resistance between the tip and ground is less than the predetermined value, the voltage at a point of the connection between the tip and the resistor will have a peak amplitude less than half that of the selected peak amplitude of the voltage source, and that when such resistance is greater than the predetermined value, such voltage will have a peak amplitude greater than half that of the selected peak amplitude of the voltage source.

7. The device of claim 5, further comprising a first and a second electrical lead in the torch housing insulated from each other, said leads adapted to contact the inner conductive coating of the cup at two different points when the cup is mounted onto the housing.

8. The device of claim 7, wherein said determining means comprises:

voltage source for supplying positive pulses to the first electrical lead and negative pulses to the second electrical lead; and means connected to the two leads for determining whether the voltage of the first lead contains negative pulses and whether the voltage of the second lead contains positive pulses.

9. The device of claim 7 wherein said device comprises at least two said comparing means and at least two said second relay means, wherein the two comparing means are connected to the torch tip through the two leads and wherein such two relays are connected in series such that the power supply will be switched on only when control signals from both comparing means indicate that the resistance between the torch tip and ground is less than the predetermined value, thereby reducing the adverse effects of component failure in the two comparing means and relay means.

10. The device of claim 5 wherein the inner coated surface of the cup and the portion of the housing adapted for mounting of the cup are complementarily threaded, so that the cup may be screwed onto the housing, said torch tip being so located that when the cup is screwed onto the housing, it surrounds a major portion of the torch tip leaving only a small portion exposed.

11. The device of claim 5 wherein said second relay means comprises:

a manually operated switch, an AND gate with one input connected to the switch and the other input to the comparing means so that the second control signal is one input signal, a triac with its first terminal grounded and its second terminal connected to the output of the AND gate, a relay coil for switching on said power supply, and a second power source connected in series with the coil and a third terminal of the triac said second power source also separately connected in series with the switch and the AND gate, so that when the switch is manually closed and the second control signal indicates that resistance between the torch tip and ground is less than the predetermined value, the output signal from the AND gate will cause the triac to conduct thereby causing the second power source to power the relay coil for switching on the power supply to the cathode.

12. An operation interlock device for reducing electrical shock hazard in using a plasma torch, said torch including a non-electrically conductive housing, a cathode, an electrically conductive torch tip adjacent to the cathode, said interlock device comprising a non-electrically conductive cup adapted to be mounted onto the housing and adjacent to the torch tip for shielding the cathode, said cup having an inner electrically conductive coating adapted for electrically contacting the torch tip when the cup is mounted onto the housing for testing the electrical resistance between the torch tip and a workpiece.

13. The device of claim 12, further comprising means for determining whether the inner coating of the cup is electrically contacting the torch tip.

14. The device of claim 12, further comprising means for comparing the resistance between the torch tip and the workpiece to a predetermined value.

* * * * *